March 5, 1940.  R. M. SOMERS  2,192,598
PHONOGRAPH RECORD RESURFACING MACHINE
Filed May 9, 1939  3 Sheets-Sheet 1
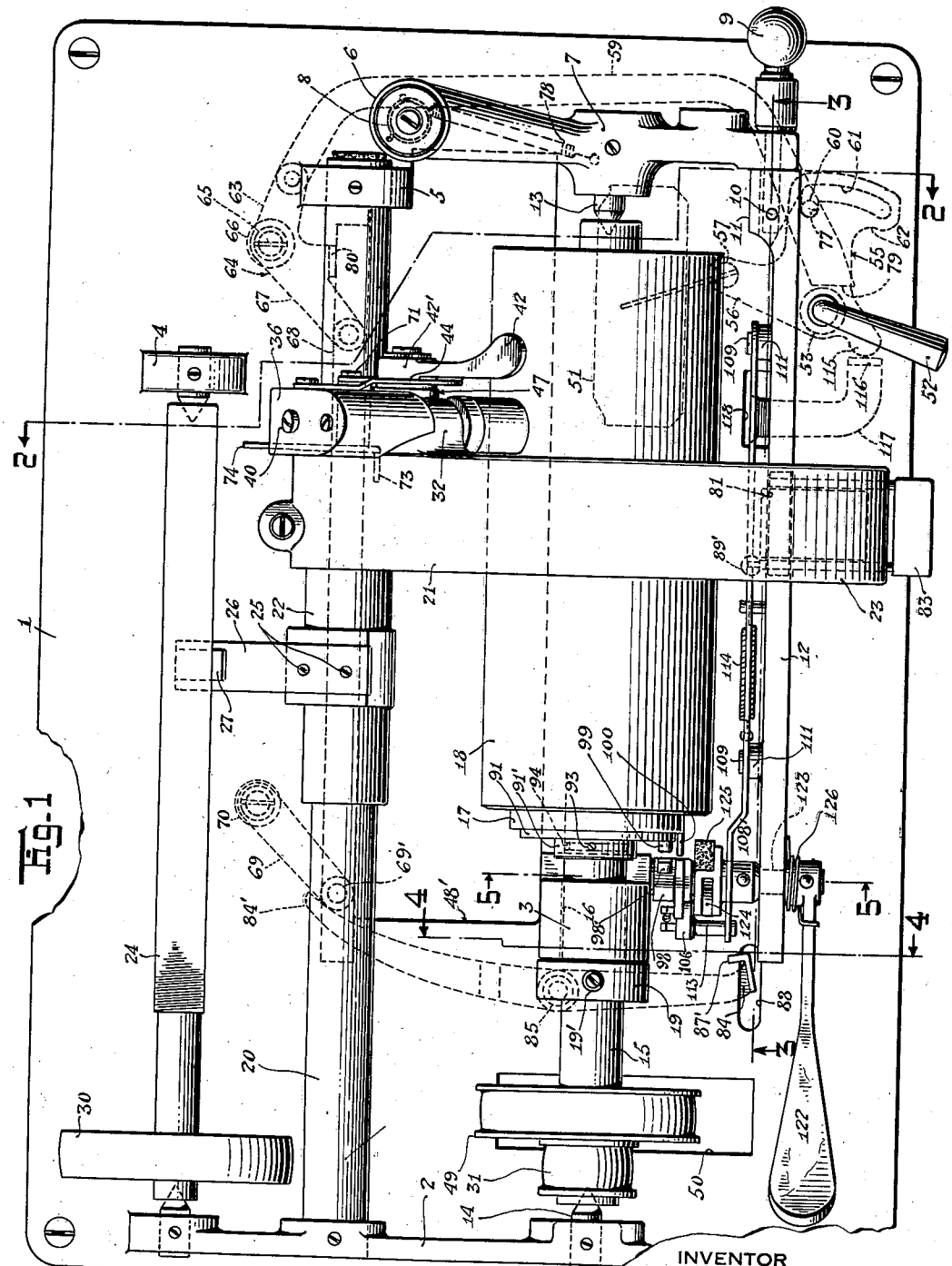
INVENTOR
Richard M. Somers
BY Henry Lanahan
ATTORNEY March 5, 1940.                R. M. SOMERS                2,192,598
                    PHONOGRAPH RECORD RESURFACING MACHINE
                         Filed May 9, 1939        3 Sheets-Sheet 2
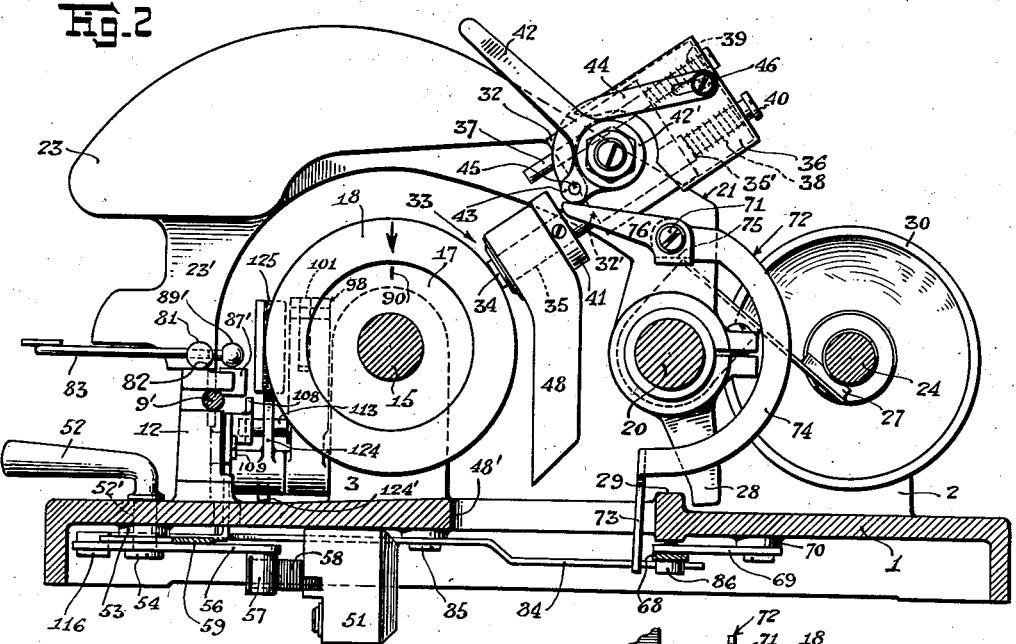
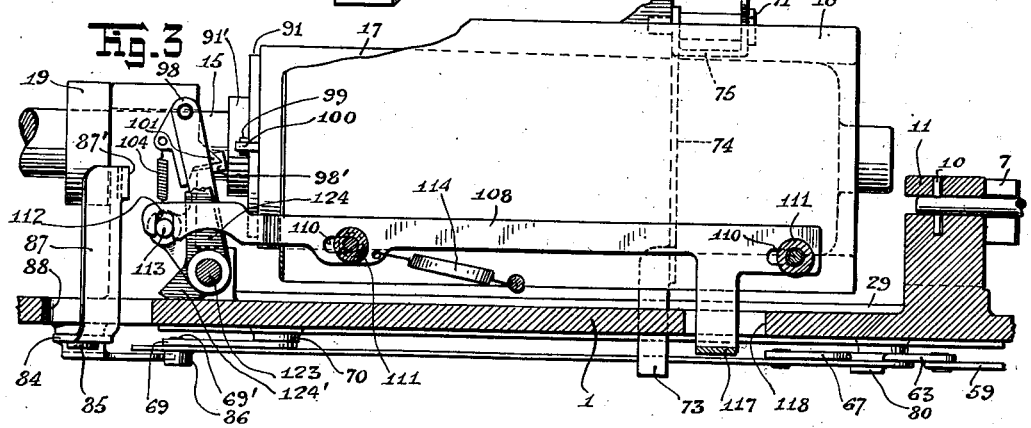
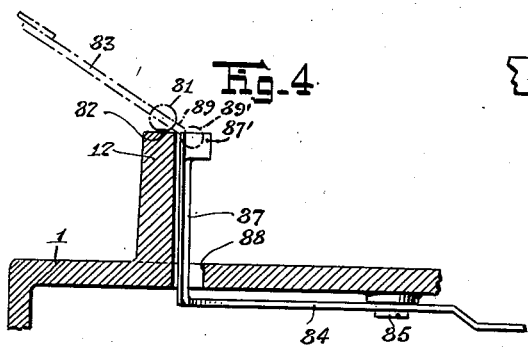
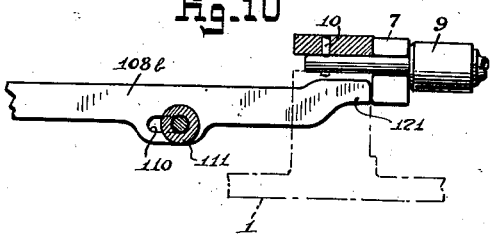
INVENTOR
Richard M. Somers
BY
Henry Lanahan
ATTORNEY March 5, 1940.           R. M. SOMERS                2,192,598
                PHONOGRAPH RECORD RESURFACING MACHINE
                   Filed May 9, 1939            3 Sheets-Sheet 3
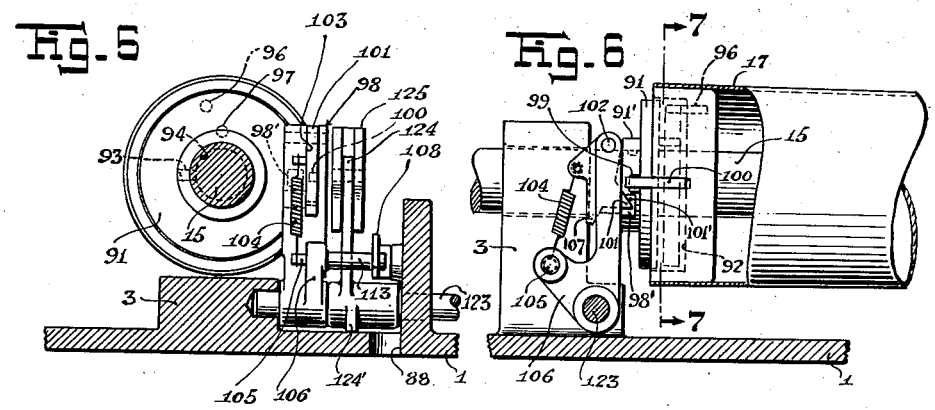
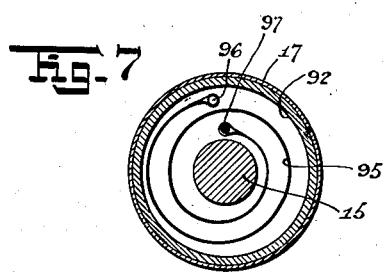
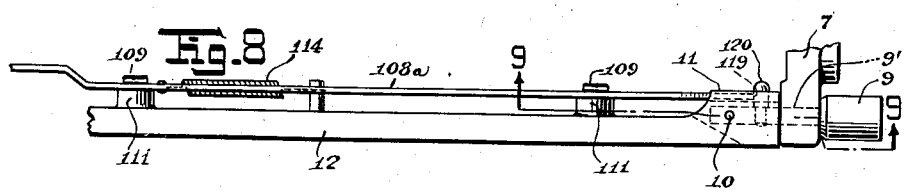
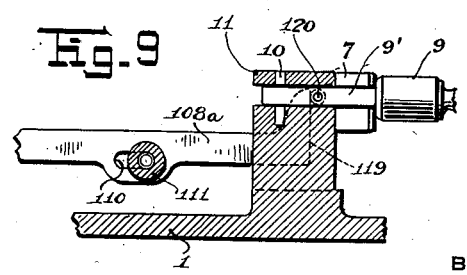
INVENTOR
Richard M. Somers
BY Henry Lanahan
ATTORNEY Patented Mar. 5, 1940

2,192,598

UNITED STATES PATENT OFFICE 2,192,598

PHONOGRAPH RECORD RESURFACING MACHINE

Richard M. Somers, West Orange, N. J., assignor to Thomas A. Edison, Incorporated, West Orange, N. J., a corporation of New Jersey Application May 9, 1939, Serial No. 272,565

17 Claims. (Cl. 82—1.1)

This invention relates to phonograph record resurfacing machines, particularly to such machines as are used to resurface phonograph records of the type employed in commercial phonographs or dictating machines, and is especially concerned with the provision of improvements in such machines for facilitating the use of the machines.

Phonograph record resurfacing machines of the form abovementioned comprise a record support or mandrel, an endgate for the mandrel, a carriage bearing a resurfacing tool settable into operative position relative to a supported record, and a driving means for rotating the mandrel and concurrently feeding the carriage relative to the mandrel, as from a start to a terminal position, to cause the tool to traverse the record. If the tool is in operative position at the time of such tool-record traversal there will be taken a first or heavy cut from the record. At the completion of a heavy cut the carriage may be returned to start position for another cut on the record, the carriage return being effected by first disengaging the carriage from its feeding means, usually by tilting the carriage upwardly, and then manually moving the carriage to start position. If this second cut is to be of normal depth the machine will be stopped and the tool will be reset. If it should, however, be desired that this second cut be of a light or finishing character, the machine need not necessarily be stopped since the carriage may be returned, and the set tool may be advanced towards the record as by a finishing-cut controlling means, each while the machine is running. When the record resurfacing is completed the machine is necessarily stopped to permit the ejection of the record from the machine; at this time there may be automatically performed various operations on the machine as an aid to the performance of another record resurfacing operation.

It is an object of my invention to provide improved means for rendering record resurfacing machines more conveniently operable.

It is another object of my invention to effect such improved operation of the machine by the provision of automatically operated means controlled by the finishing-cut controlling means.

It is another object of my invention to cause an automatic release of the resurfacing tool at the completion of a finishing cut on the record.

It is another object of my invention to provide means controlled by the finishing-cut controlling means for causing the release of the resurfacing tool from operative position as an incident to a predetermined movement of the carriage.

It is another object of my invention to control the stopping of the operation of the machine by the finishing-cut controlling means.

It is another object of my invention to provide new and improved means for controlling a brake for the mandrel. A feature of my invention is to control the mandrel brake by an automatically operated means which is controlled by the finishing-cut controlling means.

It is another object of my invention to provide means to facilitate the taking of uniform depths of cut throughout the surface of the records to be resurfaced. This is done by the provision of means to aid in locating the record and mandrel in a predetermined angular position at the time each tool setting is made. This means comprises a new and improved mandrel brake which is arranged to cause the mandrel to come to rest in a predetermined angular position upon the stopping of the machine.

Other objects and features of my invention will more fully appear from the following description and the appended claims.

In the description of my invention reference is had to the accompanying drawings, of which:

Figure 1 is a top plan view of a phonograph record resurfacing machine in which a preferred embodiment of my invention is incorporated. In this preferred embodiment the mandrel brake is controlled by the control means for the machine, which control means is shown in "on" position;

Figure 2 is a vertical sectional view, taken substantially along the line 2—2 of Figure 1;

Figure 3 is a vertical sectional view, taken along the line 3—3 of Figure 1, and partly broken away;

Figure 4 is a fractional cross-sectional view, taken substantially along the line 4—4 of Figure 1 and showing in dash-dot lines the operative position of the finishing-cut controlling means;

Figure 5 is a vertical view, partly in section on the line 5—5 of Figure 1, and showing details of the brake for the mandrel;

Figure 6 is a front elevational view, partly in section and partly broken away, showing details of the mandrel brake;

Figure 7 is a vertical sectional view, taken substantially along the line 7—7 of Figure 6;

Figure 8 is a fractional top plan view showing a modification of my invention in which the mandrel brake is controlled by the latch for the endgate;

Figure 9 is a vertical sectional view taken substantially along the line 9—9 of Figure 8; and Figure 10 is a vertical sectional view, generally similar to Figure 9, but showing another modification of my invention in which the mandrel brake is controlled by the endgate.

Reference being had to the figures there will be seen a phonograph record resurfacing machine of a form commonly used to resurface phonograph records of the type employed in dictating machines, comprising a base plate 1 having a left-hand upright standard 2, an intermediate upright standard 3, right-hand upright standards 4 and 5, and an upright boss 6 directly to the right of the standard 5. Pivoted to the boss 6 is an endgate 7 biased into open position by a torsional spring 8 but normally held in closed position, shown in Figure 1, by an endgate bolt or latch 9 pivoted as at 10 to the right end portion 11 of a guide rail 12 extending laterally along the front of the machine. The endgate 7 and standard 2 respectively carry conically pointed studs 13 and 14 which form right and left thrust bearings for a shaft 15 extending laterally of the machine in parallel relation to the guide rail 12. The shaft 15 extends through an oversized hole 16 in the intermediate standard 3, and is provided with a mandrel 17 for supporting a cylindrical record 18 to be resurfaced. To mount or remove a record from the mandrel 17 the endgate 7 is first opened to free the right end of the mandrel; during the time the endgate is open the shaft 15 is intermediately supported by the intermediate standard 3 and is retained in engagement with the conical stud 14 by reason of the contact of a collar 19, secured to the shaft by a screw 19', with the left side of the intermediate standard 3.

The removal of a record from the mandrel is effected by means of a record ejector which may comprise a handle 122 secured to a shaft 123 pivotally supported by the guide rail 12 and intermediate standard 3. On the shaft 123, between the guide rail and the standard 3, there is secured an upstanding arm 124 which carries a shoe 125 lying directly to the left of the record. The record ejector is normally held in unoperated position, defined by the contact of an extension 124' on the arm 124 with the base plate (see Figure 3), by means of a torsional spring 126 restrained at one end by the base plate and at the other end by the handle 122. To operate the ejector the handle 122 is raised against the force of the spring 126 so as to move the shoe 125 rightwardly against the record to push the record off of the mandrel.

Parallel to the shaft 15 and guide rail 12 is a rod 20 supported by the left and right standards 2 and 5. Slidably and tiltably mounted on the rod 20 is a carriage 21 having a sleeve 22 embracing the rod. As shown in Figure 2 the carriage is provided with an arm 23 curved forwardly over the mandrel 17 and terminating in a shoe 23' which normally slidably rests on the guide rail 12. The carriage is steadily moved or fed in a leftward direction across the mandrel (as from a start position at the right end of the mandrel to a terminal position at the left end of the mandrel) by a laterally extending feed screw 24 rotatably supported by the left and right standards 2 and 4. Secured to the carriage sleeve 22 by the screws 25 is a resilient and rearwardly extending arm 26 carrying a feed nut 27 which normally engages the underside of the feed screw. When the carriage arm is tilted upwardly, as until a rearwardly and downwardly extending post 28 impinges against a laterally extending ridge 29 on the base plate (see Figure 2), the feed nut 27 is moved downwardly out of engagement with the feed screw; thus while the carriage is so tilted it may be manually moved, at will, across the mandrel. When the carriage arm 23 is, however, resting on the guide rail 12, the feed nut 27 being then in engagement with the feed screw 24, a rotation of the feed screw will cause a slow steady movement of the carriage. In order that such feeding of the carriage will occur coincidentally with a rotation of the mandrel, the feed screw is provided with a pulley 30 which is coupled, as by a belt not shown, to a pulley 31 on the mandrel shaft 15. In the operation of the machine the mandrel 17 and feed screw 24 are turned in a clockwise direction, the direction of thread on the feed screw being such as to then cause a leftward feed of the carriage.

On the right side of the carriage there is an extension 32, square-shaped as viewed from the end, which substantially overlies the rod 20. The extension 32 carries a resurfacing tool 33 comprising a knife blade 34 mounted on a knife bar 35 which is slidably supported by the extension 32 for movement towards and away from the record. The means for setting the resurfacing tool into operative position—a position of the tool in which the knife blade 34 engages the record—and for releasing the same may be of a well known construction such as is disclosed in Brown Patent No. 2,137,383, issued November 22, 1938, and entitled "Record shaving machine."

A tool-setting mechanism of the abovementioned type is sufficiently described in the present instance as follows: A cap 36 is slidably mounted on the extension 32, guided by a guide rod 37, and coupled to the knife bar 35 by a compression spring 38 coiled about the knife bar between the cap 36 and a shoulder 35' on the knife bar, this coupling serving to yieldably move the knife bar downwardly towards the record when the cap 36 is moved downwardly. The cap 36 is urged upwardly by a spring 39 coiled about the guide rod 37, but upward movement of the cap 36 relative to the bar 35 is limited by a head 40 on the bar. By reason of the upward biasing of the cap 36 the knife bar is normally maintained in inoperative position, this position being defined by the contact of a collar 41 on the bar 35 with the underside 32' of the extension 32. The setting of the tool 33 is controlled by a lever 42 pivoted on the right side of the extension 32 and having a short arm 43 which is coupled to the cap 36 by an angular link 44, the link being pivoted to the arm 42 by a pin 45 and to the cap 36 by a pivot screw 46. As the lever is swung forwardly in a counter-clockwise direction the cap 36 and knife bar 35 are moved downwardly to move the tool into operative position relative to the record; in the terminal movement of the lever a lock 47, described in detail in the abovementioned Brown patent, is rendered operative to hold the tool in operative position, thereby setting the tool.

Such forward or setting movement of the lever 42 is limited to the position shown in Figure 2 by the impingement of the link 44 with the hub 42' of the lever. When the lever is in this most forward position the pin 45 is slightly past dead center with respect to the pivot axes of the lever 42 and the pivot screw 46. The upward biasing force exerted on the cap 36 then causes the lever 42 to be urged in a counter-clockwise direction—the direction in which the lever 42 is moved to set the tool—but movement of the lever in such direction is prevented by the contact of the link 44 with the hub 42'. Thus when the lever 42 reaches such limited position, the lever is releasably held there to maintain the tool in operative position. When the lever 42 is, however, tripped, or moved slightly in a clockwise direction, to return the pin 45 across the dead-center line aforementioned, the lever 42 is returned and the cap 36 is moved upwardly, as by the spring 39, to render the lock 47 inoperative and thereafter to return the tool to inoperative position.

In the operation of resurfacing a record the carriage is first moved to bring the tool into a position overlying the record. This carriage movement is effected by first tilting the carriage upwardly, to disengage the feed nut from the feed screw and to raise the tool away from the record, and then by manually moving the carriage into the position desired. When the resurfacing tool has been set into operative position the carriage is next fully returned to start position and the machine is then started to cause mandrel rotation and a feeding of the carriage along the mandrel. As the carriage is thus fed along the mandrel a first or heavy cut is taken from the record, the cut-away layer—commonly known as shaving chips—being carried by a chip-chute 48 downwardly through an opening 48' in the base plate.

The driving means for the machine—the means for feeding the carriage and rotating the mandrel—may comprise a suitable electrical motor (not shown) which may be located beneath the base plate 1 and be coupled to a pulley 49 on the mandrel shaft 15 by a belt (not shown) which may pass through an opening 50 in the base plate. To control the motor there is provided a switch 51, preferably of the single-pole single-throw toggle variety, which is mounted on the underside of the base plate in the front right-hand portion thereof. This switch is controlled by a forwardly extending control lever 52 having a shaft 52' extending downwardly through a boss 53 in the base plate. Secured to the lower end of the shaft 52' by a shoulder screw 54 is a plate 55 having a rearwardly extending arm 56 carrying a slotted, pivoted stud 57 through which slidably passes an actuating arm 58 of the switch 51. When the control lever 52 is rocked leftwardly and rightwardly the arm 58 is moved rightwardly and leftwardly to place the switch in its respective "on" and "off" positions, the arm 58 snapping into its leftward and rightward positions by reason of the toggle nature of the switch.

In the normal use of the machine there are three actions which may be selectively performed at the completion of a first cut on the record: the taking of another heavy cut, the taking of another cut of a light or finishing character, or the ejecting of the record from the machine. The taking of another heavy cut involves releasing the tool from its set position, rendering the machine inoperative to stop the rotation of the record, and resetting the tool. The release of the tool is usually done as an incident to the stopping of the machine by means of a construction such as is disclosed in Huenlich Patent No. 2,095,332, issued October 12, 1937, and entitled "Record shaving machine."

A tool-releasing means of the form abovementioned comprises a link 59 carrying a pin 60, in its forward end portion, which engages a cam slot 61 provided in a rightwardly extending portion 62 of the plate 55. The link extends rearwardly along the right side of the machine beneath the base plate to pivotally connect with a right arm 63 of an angular lever 64 pivoted centrally thereof by a screw 65 to a boss 66 extending down from the base plate. A left arm 67 of the lever 64 is pivotally connected to the right end of a bar 68 which extends laterally of the machine along the rear edge of the opening 48' slightly within this opening. The bar 68 is supported at its left end, in the manner in which it is supported at its right, by means of a link 69 pivoted at one end to the bar by a pin 69' and at the other end to a boss 70 extending down from the base plate, the link 69 and arm 67 forming a pair of parallel motion supports for the bar 68 to permit the bar to swing forwardly and rearwardly in parallel relation to the shaft 15.

On the right side of the carriage 21 there is pivotally supported, by a relatively long shoulder screw 71, a lever 72 best shown in Figure 2. The lever 72 operatively connects the bar 68 with the tool-setting lever 42 and comprises a lower vertical portion 73 slidably contacting the front edge of the bar 68, a central semi-circular portion 74 curved about the rod 20 rearwardly thereof and pivoted at its upper end on the shoulder screw 71 adjacently of the right side of the carriage, a bail portion 75 extending along the screw 71, and a forwardly extending arm portion 76 pivoted on the outer end of the screw 71 and terminating at a point directly below the arm 43 of the tool-setting lever.

The cam slot 61 is arc-shaped and has at its rearward end an inwardly extending switch 77 in which the pin 60 is retained, as whenever the switch 51 is in "on" position (see Figure 1), by a tension spring 78 which urges the link 59 leftwardly and forwardly. The link 59 extends forwardly and leftwardly from the pin 60 and terminates in a cam face 79 adapted to impinge against the boss 53 when the control lever 52 is moved rightwardly to place the switch 51 into "off" position. In the first portion of such movement of the control lever the pin 60 is held by the spring 78 in the notch 77, thereby causing the link 59 to be moved rearwardly by the counter-clockwise turning of the plate 55. A rearward movement of the link 59 effects a forward movement of the bar 68 and, by the contact of the bar with the lever 72, a clockwise movement of the lever 72. When the lever 72 is so moved its arm portion 76 impinges upon the arm 43 of the tool-setting lever 42 to impart a "tripping" or clockwise movement to the tool-setting lever, thereby releasing the tool from operative position. In the further movement of the control lever 52 to place the switch 51 into "off" position the cam face 79 impinges against the boss 53 to limit the leftward movement of the link, the pin 60 being then moved out of the notch 77. When the pin 60 is free of the notch 77 the link 59 is moved forwardly by the spring 78, with the pin 60 coming to rest in the forward end portion of the cam slot 61, the forward position of the link being defined by the contact of a lug 80 on the arm 67 with the rear edge of the bar 68.

In the leftward movement of the control lever 52 to place the switch 51 into "on" position, the pin 60 slides rearwardly relative to the cam slot 61 and comes to rest in the notch 77, the bar 68 remaining stationary. Thus it is seen that a throwing of the switch 52 to "on" position will not disturb a prior setting of the tool; whereas a throwing of the switch 51 to "off" position will, as above described, cause a release of the tool from operative position. It is, however, sometimes desirable to stop the machine without releasing the tool from operative position as, for example, at the completion of a first cut on the record so as to permit an inspection of the record surface for the purpose of determining whether a second or finishing cut is necessary. A stopping of the machine without releasing the tool may be done by holding the carriage 21 in an upwardly tilted position at the time the switch 51 is thrown to "off" position, the tilting of the carriage causing the arm 43 of the tool-setting lever 42 to be moved away from the arm portion 76 of the lever 72 so as to operatively disconnect the tool from the operating means of the switch 51.

To take a finishing cut on the record the tool, which is left in its set position, is advanced slightly towards the record by a finishing-cut controlling means, and the carriage is manually returned to its start position and is then fed to its terminal position to cause the tool to traverse the record. This finishing-cut controlling means comprises a short rod 81 mounted for pivotal movement about its longitudinal axis and extending through the shoe 23' of the carriage in parallel relation to the guide rail. The rod 81 projects radially along its length below the shoe 23' throughout a minor portion of its periphery so that the carriage arm 23 is normally supported by the guide rail by way of the rod 81. The rod 81 is provided with a flat 82 throughout its length which is normally out of contact with the guide rail; when the rod is turned to bring the flat 82 into contact with the guide rail, the carriage arm is lowered slightly to advance the tool towards the record. Turning of the rod 81 is manually effected by means of a fingerpiece 83 extending forwardly from the rod. When the fingerpiece 83 is in the position shown in Figure 2, the flat 82 is off the guide rail and the finishing-cut controlling means is in inoperative position; when the fingerpiece is, however, moved upwardly into a position indicated in dash-dot lines in Figure 4, the flat 82 is brought into contact with the guide rail to advance the tool towards the record, the finishing-cut controlling means being then in operative position.

The above described structure and mechanism are common to record shaving machines heretofore manufactured and used, and form a part of the present invention only in so far as they are related to or combined with other mechanism hereinafter described.

Since the taking of a finishing cut usually completes the resurfacing of a record, the operations which normally follow the finishing cut is to stop the machine and to eject the record therefrom. The tool may also be appropriately released at this time as an aid to the resetting of the tool for another record resurfacing operation. Since a tool-resetting involves a partial return of the carriage, from its terminal to its start position, to bring the tool into a position wherein the tool overlies the record, it is important that the tool be released before the carriage is partially returned in order to avoid possible scraping of the tool on the record. In accordance with my invention the above operations are facilitated by the provision of automatically-operated means for causing the machine to be stopped and the tool to be released at the completion of the finishing cut, thereby permitting immediate ejection of the record from the machine at the completion of the record resurfacing and normally insuring a release of the tool prior to a return of the carriage. This automatically-operated means is operated as an incident to the terminal movement of the carriage and is controlled by, or subject to, the finishing-cut controlling means. It is to be noted that a means for controlling the starting and stopping of the machine, which is subject to the finishing-cut controlling means, has been described and broadly claimed in a copending application of George H. Fritzinger, Serial No. 233,909, filed October 8, 1938, and entitled "Phonograph record resurfacing machine," which application and the present application have a common owner.

Reference being had to Figures 1, 2 and 4, there will be seen a long angular front-to-back extending lever 84 which is pivoted as at 85 to the underside of the base plate. The lever 84 has its rearward end 84' terminating at a point to the left of a head 86, provided on the pin 69' which pivotally connects the link 69 to the bar 68, and is provided at its front end with an arm 87 extending upwardly through an opening 88 in the base plate slightly to the rear and to the left of the guide rail 12 and terminating into a turned-over lug 87'. Provided on the rod 81 of the finishing-cut controlling means is a rearwardly extending pin 89 which terminates in a spherical ball 89'. When the finishing-cut controlling means is in inoperative position the spherical ball 89' is above the lug 87' (see Figure 2). When the finishing-cut controlling means is, however, moved into operative position the ball 89' is moved downwardly so that, in the terminal movement of the carriage, the ball impinges against the lug 87' to cause the lever 84 to be turned in a clockwise direction by the carriage. Such turning of the lever 84 effects, as because of its contact with the head 86 on the bar 68, a forward movement of the bar 68 to cause the release of the tool from operative position, the same as when the switch 51 is thrown to "off" position as heretofore described. Moreover, as the bar 68 is moved forwardly the plate 55 is turned in a counter-clockwise direction, by reason of the heretofore described lever 64 and link 59 which serve to couple the bar 68 to the plate 55, to cause the switch 51 to be thrown to "off" position. Thus by the terminal movement of the carriage at the completion of a finishing cut on the record, the tool is not only released but the machine is also stopped.

It is an additional feature of my invention that when the switch 51 is thrown to "off" position to stop the machine, either manually by the lever 52 or by the terminal movement of the carriage at the completion of a finishing cut as above described, a brake is applied to the mandrel to cause the mandrel to come to rest in a predetermined angular position. The stopping of the mandrel in a predetermined angular position is effected for the purpose of aiding the operator, in repeated settings of the tool, to locate the record and mandrel each in a predetermined angular position at the time of the setting of the tool. It will be understood that such locating of the record and mandrel is important in obtaining a uniform depth of cut around the periphery of the record since the average depth of cut is of the order of only .002" or less and an eccentricity in the mandrel, which is only of an extent comparable to such average depth of cut, may cause a considerable non-uniformity in the depth of cut around the periphery of the record. Such non-uniformity in depth of cut will, however, be avoided when both the record and mandrel are located in substantially the same angular position each time the tool is set on the record. When a non-uniform depth of cut is obtained there is a waste of time and of record material in view of the additional cuts which are required to completely obliterate the recordation on the record. While records have been made in the past with an indicating arrow at one end and the mandrel with a cooperating groove 90, as shown in Figure 2, by which the record could be angularly aligned with respect to the mandrel, such alignment could be made only by first ascertaining the position in which the mandrel had come to rest and then orienting the record on the mandrel until the proper alignment was obtained. In accordance with my invention this alignment of the record on the mandrel is very greatly facilitated by the provision of a brake to cause the mandrel to come to rest always in substantially the same angular position.

The abovementioned mandrel brake may suitably be of the form shown in Figures 1, 3, 5, 6 and 7. This brake comprises a collar 91 rotatably mounted on the mandrel shaft 15 and fitting into an annular recess 92 provided in the left end of the mandrel (see Figure 6), the collar 91 being restricted against movement longitudinally of the shaft 15 by means of a pin 93 which passes through the hub 91' of the collar 91 to engage an annular groove 94 in the shaft, as shown in Figure 1. The collar is resiliently coupled to the mandrel by means of a torsional spring 95 which is disposed in the recess 92 between the collar 91 and the mandrel as shown in Figure 7, and which is connected at one end to a pin 96 on the mandrel and at the other end to a pin 97 on the collar. To the left of the collar 91 there is provided an upright stop member or lever 98 which is pivoted on the rod 123 that supports the record ejector. To render the mandrel brake operative the lever 98 is moved rightwardly substantially into contact with the collar 91 so as to stop rotation of the collar by the impingement of a cross pin or tooth 99 on the collar with a pin 98' on the lever (the direction of rotation of the mandrel being counter-clockwise as the mandrel is viewed from the right). Such stopping of the collar 91 is adapted to occur at, or shortly after, the time the power to the machine is shut off. The mandrel will at such time have sufficient kinetic energy stored therein to cause the mandrel to turn through several revolutions before it is stopped. The turning of the mandrel which is subsequent to the time the power to the machine is shut off and to the time the collar 91 is stopped against rotation, is opposed by the winding of the torsional spring 95, such winding causing the kinetic energy of the mandrel to be converted into potential energy in the spring. When this conversion of energy is completed, the cycle is reversed, the mandrel being then turned in a reverse or clockwise direction by the spring 95. The reverse turning of the mandrel is, however, limited by a ratchet comprising a catch or tooth 100 extending leftwardly from the rim of the mandrel and a pawl 101 pivoted at 102 on the lever 98, the lever being provided with a slot 103 in which the pawl is disposed. The pawl 101 is biased towards the mandrel by a tension spring 104, connected between the pawl and a pin 105 on an arm 106 of the lever (see Figure 6), but the pawl is limited in movement in the direction of its biasing by the impingement of an extension 107 of the pawl against the lever 98 at the base of the slot 103. When the lever 98 is moved towards the mandrel to stop the collar 91 the pawl 101 is moved into the path of the tooth 100. Due to the upper edge 101' of the pawl 101 being inclined (see Figure 6) the tooth readily slides past the pawl 101 so as not to impede the counter-clockwise turning of the mandrel—the direction in which the mandrel is driven in the operation of the machine. When, however, the mandrel is turned in its reverse direction by the spring 95, as above explained, the tooth 100 impinges against the underside of the pawl to stop the turning of the mandrel, the mandrel being thus always stopped in the same angular position. In order that the mandrel will not be moved by the torsional spring 95 when the mandrel brake is moved to inoperative position—the position the brake occupies in Fig. 3—the brake is arranged so that the pin 98' will disengage from its cooperating pin 99 on the collar 91 before the pawl 101 is disengaged from its cooperating tooth 100 on the mandrel.

The mandrel brake is preferably controlled so that it will be rendered operative coincidentally with the shutting off of the power to the machine, i. e., with the throwing of the switch 51 to "off" position. The means for so controlling the mandrel brake is shown in Figures 1 and 3, and comprises a slide bar 108 which is mounted on the back side of the guide rail 12 by means of a pair of shoulder screws 109 which pass respectively through a pair of slots 110 in the bar 108 to thread into respective bosses 111 extending rearwardly of the guide rail. The bar 108 is coupled to the mandrel brake by means of a socket 112 at its left end which engages a cross pin 113 on the arm 106 of the lever 98, and is urged rightwardly by a tension spring 114 to bias the mandrel brake into operative position. The bar 108 is operatively connected with the switch 51 by the contact of an extension 115 on the plate 55 of the switch operating means (see Figure 1) with a shoe 116 provided on an angular arm 117 of the bar 108, the arm 117 extending downwardly from the right end portion of the bar 108 through an opening 118 in the base plate and then forwardly and rightwardly to terminate into the shoe 116. When the control lever 52 is moved leftwardly to throw the switch 51 into "on" position the bar 108 is moved leftwardly, by the impingement of the extension 115 upon the shoe 116, to render the mandrel brake inoperative, the brake being retained in inoperative position against its biasing when the machine is in operation by the biasing of the plate 55 as caused by the toggle nature of the switch 51. When the control lever 52 is, however, moved rightwardly to throw the switch 51 into "off" position the mandrel brake is moved into operative position by the spring 114, thereby applying the brake to the mandrel as an incident to the stopping of the machine.

In Figures 8 and 9 there is shown a modified form of my invention in which the mandrel brake, which may be of the form above described or of conventional form, is controlled by the endgate latch 9. In this modification the bar 108 is slightly altered, being extended rightwardly almost to the right end of the guide rail and having the arm 117 removed, and is given the reference character 108a. At the right end of the bar 108a there is provided a shoe 119 which extends upwardly to the level of the shaft 9' of the endgate latch 9, and on the shaft 9' there is provided a rearwardly extending pin 120. As the endgate latch 9 is moved to operative position—the position it occupies in Figure 8—to hold the endgate 7 in closed position, the pin 120 impinges against the shoe 119 and moves the bar 108a leftwardly to render the mandrel brake inoperative. When the endgate latch 9 is, however, moved to inoperative position to open the endgate, the pin 120 is moved free of the shoe 119 and the bar 108a is moved rightwardly by the spring 114 to render the mandrel brake operative.

In another modification of my invention, shown in Figure 10, the mandrel brake is controlled directly by the endgate 7. In this modification the bar 108 is again altered and is given the reference character 108b, the bar having the arm 117 removed and being extended rightwardly, slightly further than the bar 108a, to terminate in a shoe 121. When the endgate 7 is closed the bar 108b is retained in its leftward position by the abutment of the shoe 121 against the endgate to render the mandrel brake inoperative. However, as the endgate is opened it is moved free of the shoe 121, thereby permitting the bar 108b to move rightwardly, as because of its biasing, to render the mandrel brake operative.

Although I have herein shown and described certain embodiments of my invention, it will be understood that these embodiments are subject to many changes and modifications without departure from the scope of my invention, which I undertake to express according to the following claims.

I claim:

1. In a phonograph record resurfacing machine having a record support: the combination of a carriage means movable relative to said support between start and terminal positions; a resurfacing tool on said carriage means settable into operative position relative to a supported record; a finishing-cut controlling means movable between operative and inoperative positions; and means, operatively associated with both said carriage means and said finishing-cut controlling means and controlled according to the positioning of both said means, for causing said tool to be moved out of operative position.

2. In a phonograph record resurfacing machine having a record support: the combination of a carriage movable relative to said support; a resurfacing tool on said carriage settable into operative position relative to a record on said support; a finishing-cut controlling means for advancing the tool towards the record; and means, controlled by said finishing-cut controlling means and operated by said carriage, for causing said resurfacing tool to be moved out of operative position.

3. In a phonograph record resurfacing machine having a record support: the combination of a carriage capable of forward and return movements relative to said support; a resurfacing tool on said carriage settable into operative position relative to a record on said support; a finishing-cut controlling means for advancing the tool towards the record; and means, controlled by said finishing-cut controlling means and operated incidental to the movement of said carriage through the end portion of its forward travel, for causing said resurfacing tool to be moved out of operative position.

4. In a phonograph record resurfacing machine having a record support: the combination of a carriage adapted to be driven and otherwise manually moved relative to said support; a resurfacing tool on said carriage settable into operative position relative to a record on said support; means for driving said carriage; a finishing-cut controlling means for advancing said tool towards the record; and means, controlled by said finishing-cut controlling means and operated incidental to a driven movement of said carriage through a predetermined portion of its path of travel, for causing said resurfacing tool to be moved out of operative position.

5. In a phonograph record resurfacing machine having a record support: the combination of a carriage; a resurfacing tool on said carriage settable into operative position relative to a record on said support and releasable therefrom; a finishing-cut controlling means having operative and inoperative positions; means for driving said carriage in a direction operative to cause a cut to be taken from the record by said tool; and means, operatively connected with said tool and rendered effective when said finishing-cut controlling means is in operative position, for releasing said tool at the completion of a finishing-cut on the record.

6. In a phonograph record resurfacing machine having a record support: the combination of a movable carriage; a resurfacing tool on said carriage settable into operative position relative to a record on said support and releasable therefrom; a finishing-cut controlling means movable into operative position to advance said tool towards the record; and means, effective only when said finishing-cut controlling means is in operative position and operated incidental to a predetermined movement of said carriage, for causing the release of said tool.

7. In a phonograph record resurfacing machine having a record support: the combination of a carriage; a resurfacing tool on said carriage settable into operative position relative to a record on said support; a finishing-cut controlling means movable into operative position; driving means for moving said carriage to cause said tool to traverse the record; a control device movable to start and stop said driving means; and means, operated incidental to the terminal movement of said carriage when said finishing-cut controlling means is in operative position, for moving said control device to stop said driving means and for concurrently causing said tool to be moved out of operative position.

8. In a phonograph record resurfacing machine having a rotatable record support: the combination of a tool-carriage; means for driving said tool-carriage relative to said support; a control device movable to start and stop the operation of the machine; a finishing-cut controlling means movable into operative and inoperative positions; and means, effective only when said finishing-cut controlling means is in operative position and operated by the terminal movement of said tool-carriage, for moving said control device to stop the machine.

9. In a phonograph record resurfacing machine having a record-supporting mandrel: the combination of a tool-carriage; driving means for rotating said mandrel and moving said tool-carriage along the mandrel; a control device movable to start and stop the operation of the machine; a finishing-cut controlling means movable into operative and inoperative positions; a mandrel brake; and means, operated incidental to the terminal movement of said tool-carriage only when said finishing-cut controlling means is in operative position, for moving said control device to stop the machine and for concurrently rendering said mandrel brake operative.

10. In a phonograph record resurfacing machine having a rotatable record-supporting mandrel: the combination of a mandrel brake; a tool-carriage movable along said mandrel into a terminal position; a resurfacing tool settable into operative position relative to a supported record and releasable therefrom; a finishing-cut controlling means for advancing said tool towards the record; a control device movable to start and stop the operation of the machine; and means, controlled by said finishing-cut controlling means and operated incidental to the movement of said carriage into its terminal position, for releasing said tool, moving said control device to stop the machine and rendering said mandrel brake operative.

11. In a phonograph record resurfacing machine having a rotatable record-supporting mandrel: the combination of a tool-carriage movable along said mandrel; a finishing-cut controlling means movable into operative and inoperative positions; a mandrel brake; and means, operated incidental to the movement of said tool-carriage and controlled according to the positioning of said finishing-cut controlling means, for rendering said mandrel brake operative.

12. In a phonograph record resurfacing machine having a rotatable record-supporting mandrel: means for stopping the rotation of said mandrel caused by the storage of kinetic energy in the mandrel comprising means for converting the kinetic energy in said mandrel into potential energy, and means for utilizing said potential energy to cause said mandrel to be held substantially in a predetermined angular position when said energy conversion is completed.

13. In a phonograph record resurfacing machine having a rotatable support for a record: means for stopping rotation of said support caused by the storage of kinetic energy in the support, comprising yieldable means for opposing the rotation of the support, and means for limiting reverse rotation of the support by said yieldable means to a predetermined position in its angular travel.

14. In a phonograph record resurfacing machine having a record-supporting mandrel and means for rotating said mandrel: the combination of a control device for rendering said rotating means ineffective; and a brake for said mandrel comprising clutch means controlled by said control device, means controlled by said clutch means for converting kinetic energy of rotation of said mandrel into potential energy, and means for utilizing said potential energy to cause said mandrel to be yieldably held in a predetermined angular position when said energy conversion is completed.

15. In a phonograph record resurfacing machine having a record-supporting mandrel and means for rotating said mandrel: the combination of a control device operable into stop position to render said rotating means ineffective; and a mandrel brake, rendered effective as an incident to the operation of said control device to stop position and comprising a toothed member and a cooperative stop member, for causing said mandrel to come to rest substantially in a predetermined angular position.

16. In a phonograph record resurfacing machine having a record-supporting mandrel: the combination of driving means for rotating said mandrel; a control device operable to render said driving means ineffective to rotate said mandrel; and a brake for said mandrel controlled by said control device and comprising an engageable device having yieldable means for opposing rotation of said mandrel in the direction of its driven movement, and a ratchet-catch for limiting the rotation of said mandrel by said yieldable means in the direction opposite to its driven movement, whereby upon rendering said driving means ineffective said mandrel is brought to rest in a predetermined angular position.

17. In a phonograph record resurfacing machine having a record-supporting mandrel and means for rotating said mandrel: the combination of control means for rendering said rotating means ineffective; and means for stopping said mandrel in a predetermined angular position when said driving means is rendered ineffective comprising a member angularly stationary relative to the movement of said mandrel, a yieldable clutch means controlled by said control means for resiliently coupling said mandrel with said member, and means for limiting reverse movement of said mandrel by said yieldable means to a predetermined position in its angular travel.

RICHARD M. SOMERS.